(12) United States Patent  (10) Patent No.: US 7,274,163 B1
Lambert et al.  (45) Date of Patent: Sep. 25, 2007

(54) METHODS AND APPARATUS FOR COMMUTATING A BRUSHLESS DC MOTOR IN A LASER PRINTER

(75) Inventors: Aaron M. Lambert, Lexington, KY (US); Steven M. Turney, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 11/394,778

(22) Filed: Mar. 31, 2006

(51) Int. Cl.
*H02P 6/10* (2006.01)

(52) U.S. Cl. .................. 318/254; 318/610; 318/721
(58) Field of Classification Search ............. 318/138, 318/254, 439, 720–724, 610; 388/906
See application file for complete search history.

(56) References Cited

U.S. PATENT DOCUMENTS

| | | | | |
|---|---|---|---|---|
| 4,353,016 A | * | 10/1982 | Born ..................... | 318/254 |
| 5,723,957 A | * | 3/1998 | Ishikawa ................ | 318/254 |
| 6,091,216 A | * | 7/2000 | Takahashi et al. ....... | 318/254 |
| 6,534,948 B2 | * | 3/2003 | Ohura et al. ........... | 318/798 |
| 6,710,572 B2 | * | 3/2004 | Okubo ................... | 318/727 |
| 6,828,752 B2 | * | 12/2004 | Nakatsugawa et al. ... | 318/801 |
| 6,933,690 B2 | * | 8/2005 | Yamamoto .............. | 318/254 |

* cited by examiner

*Primary Examiner*—Bentsu Ro
(74) *Attorney, Agent, or Firm*—King & Schickli, PLLC

(57) ABSTRACT

In a laser printer, methods and apparatus include commutating a brushless dc motor having three windings. A controller receives discrete motor position signals, such as from hall-effect or FG sensors, and extrapolates motor position between the signals. It commutates the motor based on the extrapolated motor position and updates motor position whenever an actual discrete signal is received. Drive signals from the controller to the motor are such that a current flowing in any of the three windings follows a generally sinusoidal waveform. High and low switches are provided per each winding of the three windings and are cumulatively switched according to an extrapolated motor position based multiplier applied to a pulse width modulation duty cycle. In this regard, lookup tables, counters, registers and the like are provided. An engine card of the printer includes an ASIC with a power driver for use with generally off-the-shelf brushless dc motors.

17 Claims, 10 Drawing Sheets

| X-Position(0 to 255) | Y-Value 8 bit value | X-Position(0 to 255) | Y-Value 8 bit value | X-Position(0 to 255) | Y-Value 8 bit value | X-Position(0 to 255) | Y-Value 8 bit value | X-Position(0 to 255) | Y-Value 8 bit value |
|---|---|---|---|---|---|---|---|---|---|
| 0 | 126 | 51 | 250 | 102 | 235 | 153 | 0 | 204 | 0 |
| 1 | 131 | 52 | 249 | 103 | 232 | 154 | 0 | 205 | 0 |
| 2 | 136 | 53 | 247 | 104 | 230 | 155 | 0 | 206 | 0 |
| 3 | 142 | 54 | 246 | 105 | 227 | 156 | 0 | 207 | 0 |
| 4 | 147 | 55 | 244 | 106 | 224 | 157 | 0 | 208 | 0 |
| 5 | 152 | 56 | 242 | 107 | 221 | 158 | 0 | 209 | 0 |
| 6 | 157 | 57 | 240 | 108 | 218 | 159 | 0 | 210 | 0 |
| 7 | 162 | 58 | 238 | 109 | 214 | 160 | 0 | 211 | 0 |
| 8 | 167 | 59 | 236 | 110 | 211 | 161 | 0 | 212 | 0 |
| 9 | 171 | 60 | 233 | 111 | 207 | 162 | 0 | 213 | 0 |
| 10 | 176 | 61 | 231 | 112 | 204 | 163 | 0 | 214 | 0 |
| 11 | 180 | 62 | 228 | 113 | 200 | 164 | 0 | 215 | 0 |
| 12 | 185 | 63 | 225 | 114 | 196 | 165 | 0 | 216 | 0 |
| 13 | 189 | 64 | 220 | 115 | 192 | 166 | 0 | 217 | 0 |
| 14 | 193 | 65 | 223 | 116 | 188 | 167 | 0 | 218 | 0 |
| 15 | 197 | 66 | 226 | 117 | 183 | 168 | 0 | 219 | 0 |
| 16 | 201 | 67 | 229 | 118 | 179 | 169 | 0 | 220 | 0 |
| 17 | 205 | 68 | 231 | 119 | 174 | 170 | 0 | 221 | 0 |
| 18 | 208 | 69 | 234 | 120 | 170 | 171 | 0 | 222 | 0 |
| 19 | 212 | 70 | 236 | 121 | 165 | 172 | 0 | 223 | 0 |
| 20 | 215 | 71 | 239 | 122 | 160 | 173 | 0 | 224 | 0 |
| 21 | 219 | 72 | 241 | 123 | 155 | 174 | 0 | 225 | 0 |
| 22 | 222 | 73 | 243 | 124 | 150 | 175 | 0 | 226 | 0 |
| 23 | 225 | 74 | 245 | 125 | 145 | 176 | 0 | 227 | 0 |
| 24 | 228 | 75 | 246 | 126 | 140 | 177 | 0 | 228 | 0 |
| 25 | 231 | 76 | 248 | 127 | 135 | 178 | 0 | 229 | 0 |
| 26 | 233 | 77 | 249 | 128 | 129 | 179 | 0 | 230 | 0 |
| 27 | 236 | 78 | 250 | 129 | 124 | 180 | 0 | 231 | 0 |
| 28 | 238 | 79 | 252 | 130 | 118 | 181 | 0 | 232 | 0 |
| 29 | 240 | 80 | 253 | 131 | 113 | 182 | 0 | 233 | 0 |
| 30 | 242 | 81 | 253 | 132 | 107 | 183 | 0 | 234 | 0 |
| 31 | 244 | 82 | 254 | 133 | 101 | 184 | 0 | 235 | 0 |
| 32 | 246 | 83 | 254 | 134 | 96 | 185 | 0 | 236 | 6 |
| 33 | 247 | 84 | 255 | 135 | 90 | 186 | 0 | 237 | 13 |
| 34 | 249 | 85 | 255 | 136 | 84 | 187 | 0 | 238 | 19 |
| 35 | 250 | 86 | 255 | 137 | 78 | 188 | 0 | 239 | 25 |
| 36 | 251 | 87 | 255 | 138 | 72 | 189 | 0 | 240 | 31 |
| 37 | 252 | 88 | 255 | 139 | 66 | 190 | 0 | 241 | 37 |
| 38 | 253 | 89 | 254 | 140 | 60 | 191 | 0 | 242 | 44 |
| 39 | 254 | 90 | 254 | 141 | 54 | 192 | 0 | 243 | 50 |
| 40 | 254 | 91 | 253 | 142 | 48 | 193 | 0 | 244 | 56 |
| 41 | 255 | 92 | 252 | 143 | 42 | 194 | 0 | 245 | 62 |
| 42 | 255 | 93 | 251 | 144 | 35 | 195 | 0 | 246 | 68 |
| 43 | 255 | 94 | 250 | 145 | 29 | 196 | 0 | 247 | 74 |
| 44 | 255 | 95 | 248 | 146 | 23 | 197 | 0 | 248 | 80 |
| 45 | 255 | 96 | 247 | 147 | 17 | 198 | 0 | 249 | 86 |
| 46 | 254 | 97 | 245 | 148 | 10 | 199 | 0 | 250 | 92 |
| 47 | 254 | 98 | 243 | 149 | 4 | 200 | 0 | 251 | 98 |
| 48 | 253 | 99 | 241 | 150 | 0 | 201 | 0 | 252 | 103 |
| 49 | 252 | 100 | 239 | 151 | 0 | 202 | 0 | 253 | 109 |
| 50 | 251 | 101 | 237 | 152 | 0 | 203 | 0 | 254 | 115 |
|    |     |     |     |     |     |     |     | 255 | 120 |

*FIG. 6*

METHODS AND APPARATUS FOR COMMUTATING A BRUSHLESS DC MOTOR IN A LASER PRINTER

FIELD OF THE INVENTION

Generally, the present invention relates to laser printers. Particularly, it relates to brushless dc motors useful in controlling motion of various components in the printer. In one aspect, a quieter operating motor is contemplated. In another, commutation of the motor includes extrapolating between position feedback signals and making updates of same.

BACKGROUND OF THE INVENTION

As is known, laser printers use motors to impart motion to various movable components, such as mirrors, belts, drums, paper transport structures, etc. However, many modern motors rotate at speeds with fundamental commutation frequencies and harmonics in the audible range. To end users, this sometimes causes hearing annoyance, especially considering motors often vibrate connected structures such as metal frames. To avoid this, some manufacturers have focused on increasing the number of poles of a motor or by commutating with other than square wave signals, to name a few. Unfortunately, increasing motor poles does not eliminate the hearing annoyance because this just shifts the fundamental frequency and harmonics to a higher value in the audible range. With non-square wave commutation, motor feedback often requires more than the three or so typically provided feedback sensor signals. Both are also quite complex and relatively expensive.

Accordingly, there exists a need in the art for eliminating motor noise in laser printers. It would be particularly useful if such could be accomplished by smoothing motor commutation and doing so with typical motor components. Naturally, any improvements should further contemplate good engineering practices, such as relative inexpensiveness, stability, low complexity, etc.

SUMMARY OF THE INVENTION

The above-mentioned and other problems become solved by applying the principles and teachings associated with the hereinafter described commutation of a brushless dc motor in a laser printer. Specifically, methods and apparatus contemplate utilizing standard or off-the-shelf motors with a commutation scheme that extrapolates motor position at times between receipts of discrete signals from position sensors of the motor and updating the motor position whenever an actual discrete signal is received. In this regard, a laser printer includes an engine card interfacing with the motor and its typical hall-effect sensor signals, times three, and an encoder, such as an FG (frequency generator) signal.

In a representative embodiment, the engine card contemplates an ASIC controller with a PID (proportional, integral, derivative) controller and commutator logic. The PID logic produces a pulse width modulation (PWM), in duty cycle, for application to any winding of the motor. The commutator logic includes a lookup table with a multiplier for the PWM. High and low switches are provided per each winding of the three windings and are cumulatively switched according to the extrapolated motor position PWM and the multiplier. In this regard, lookup tables, counters, registers and the like are provided.

These and other embodiments, aspects, advantages, and features of the present invention will be set forth in the description which follows, and in part will become apparent to those of ordinary skill in the art by reference to the following description of the invention and referenced drawings or by practice of the invention. The aspects, advantages, and features of the invention are realized and attained by means of the instrumentalities, procedures, and combinations particularly pointed out in the appended claims.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIG. 6 is a table in accordance with the present invention of the graph of FIG. 5;

DETAILED DESCRIPTION OF THE PREFERRED EMBODIMENTS

In the following detailed description of the preferred embodiments, reference is made to the accompanying drawings that form a part hereof, and in which is shown by way of illustration, specific embodiments in which the invention may be practiced. These embodiments are described in sufficient detail to enable those skilled in the art to practice the invention and like numerals represent like details in the various figures. Also, it is to be understood that other embodiments may be utilized and that process, mechanical, electrical and/or other changes may be made without departing from the scope of the present invention. In accordance with the present invention, commutation of a brushless dc motor in a laser printer is hereafter described.

Figure 1:
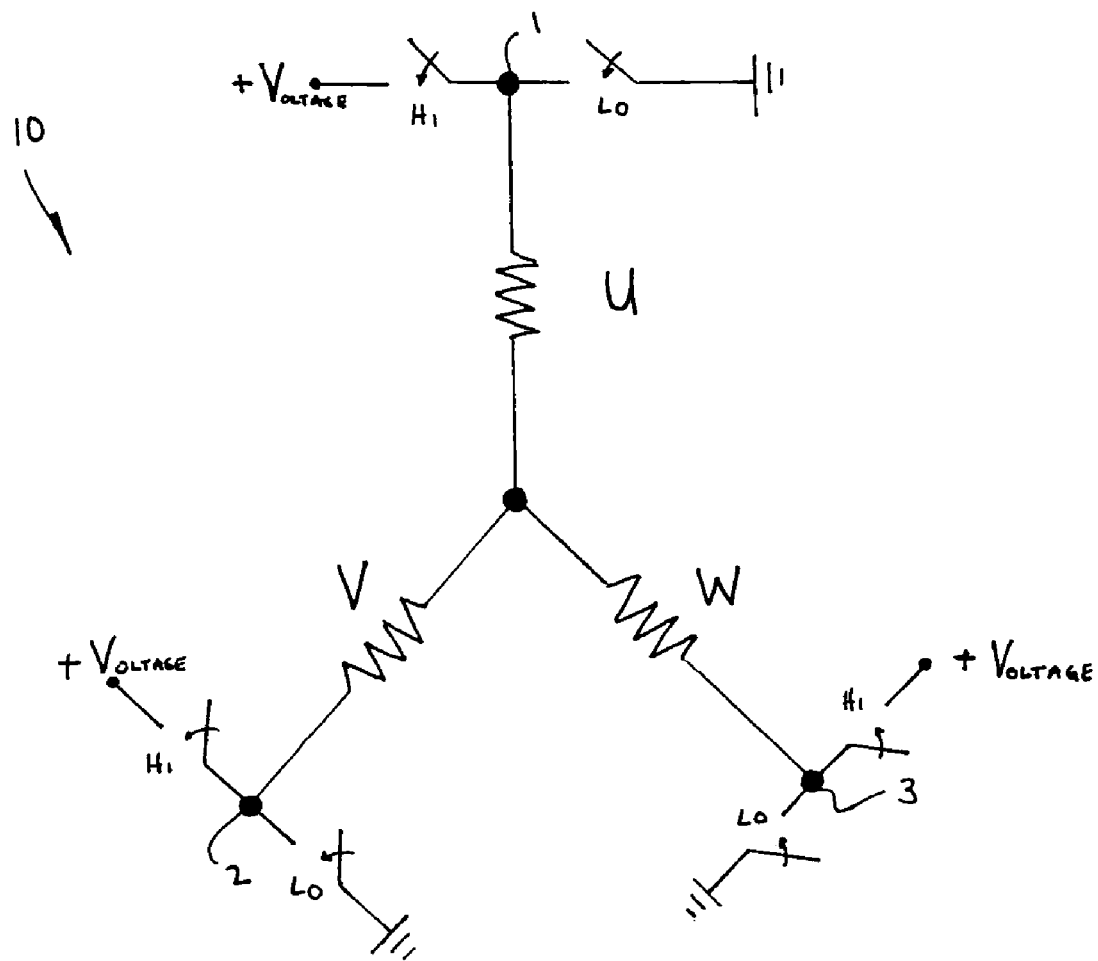
FIG. 1 is a diagrammatic view in accordance with the present invention of the windings and switch control of a brushless dc motor in a laser printer.

With reference to FIG. 1, the three windings of a brushless dc motor 10 for use in a laser printer are given as windings U, V, and W. Per each winding, nodes 1, 2, and 3 provide a cumulative input to the winding and such is defined by a high HI and low LO switch. Further, the HI side includes a connection to a positive +$V_{OLTAGE}$ value and such is on the order of about +24 V. On the LO side, a ground connects and such corresponds to the ground of the laser printer. During use, the HI and LO switch per each winding is switched on and off to commutate the motor. Of course, care must be taken that the HI and LO switch of any given node are not both turned on simultaneously which would create a direct path from the input power to ground. In turn, each winding is commutated such that a current flowing therein follows a generally sinusoidal waveform with each winding being adjusted in time from the other windings. Because perfect sine waves have no higher harmonics in the frequency domain, noise reduction of the motor, and attendant laser printer, is achieved.

Figure 2:
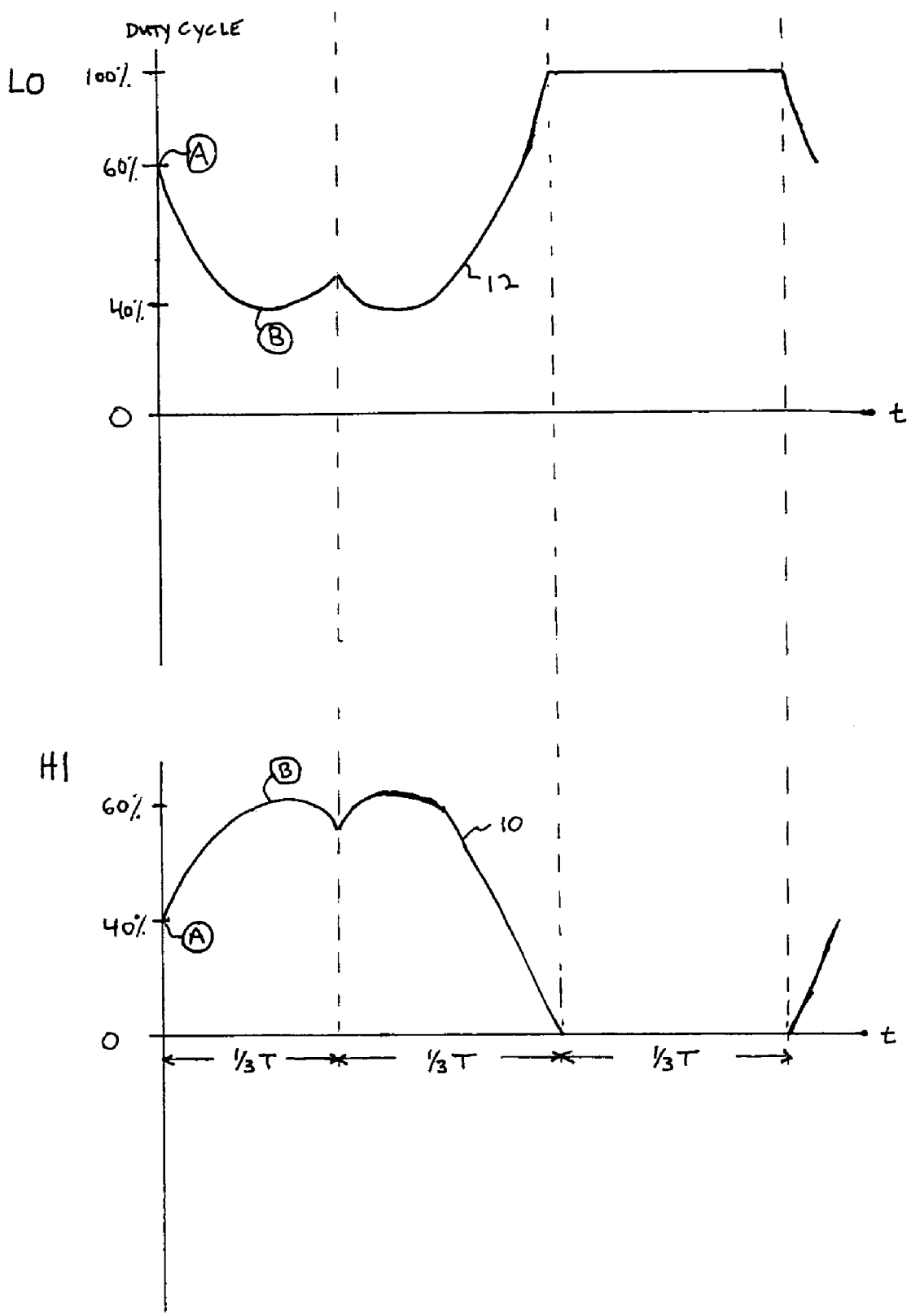
FIG. 2 is a graph in accordance with the present invention of a preferred signal per a given winding of the brushless dc motor in a laser printer.
Figure 3:
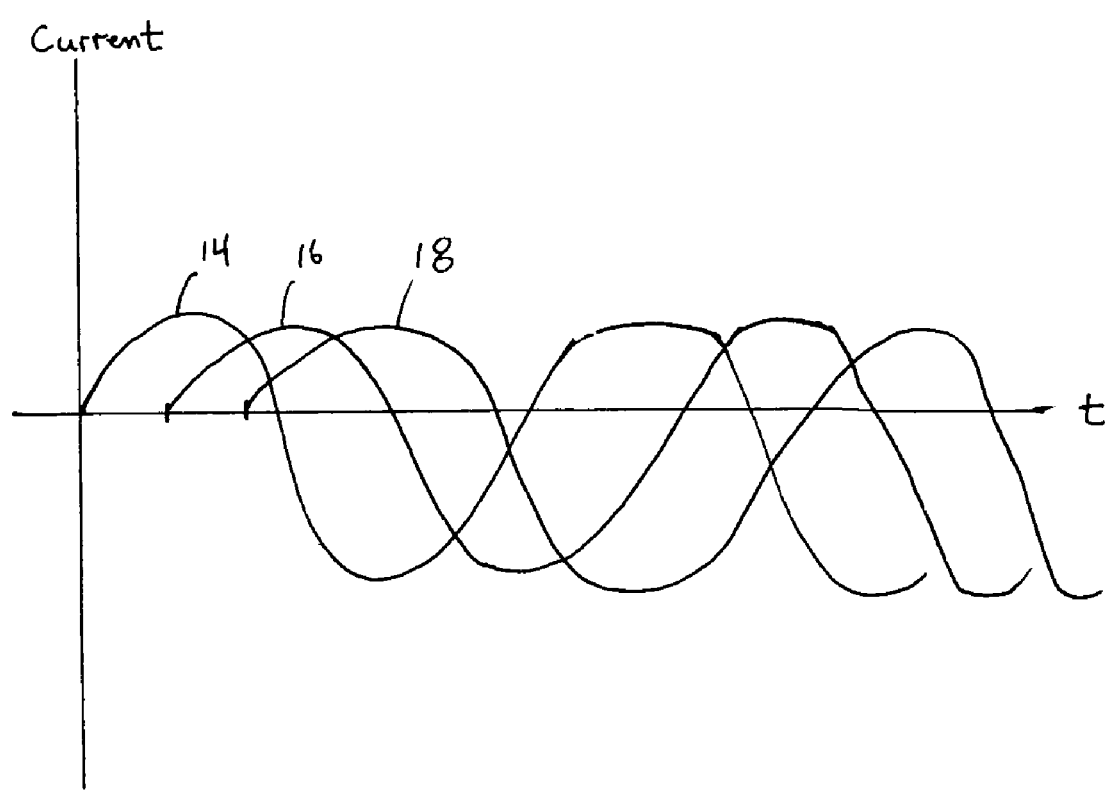
FIG. 3 is a graph in accordance with the present invention of a preferred current per each of the windings of the brushless dc motor in a laser printer.

With reference to FIG. 2, representative waveforms applied to the HI and LO switches per each winding are given. That is, the HI switch is pulse width modulated (e.g., the HI switch is opened and closed for variable periods of time), and is given as a function of duty cycle, according to the waveform 10. The inverse 12 of the waveform is that which is applied to the LO switch and cumulatively the waveforms correspond to a 100% duty cycle. Also, because of the shape of the waveforms, their cumulative effect is that of a sinusoidal current waveform through a given winding and a sinusoidal waveform per a differential voltage between any two of the three nodes. For instance, at time A, the HI switch has a duty cycle of 40% while the LO switch has a duty cycle of 60%. Similarly, at time B, the HI corresponds to 60% while the LO is 40%, and so on. As a result, the actual current through a given winding is a substantially sinusoidal waveform 14 as seen in FIG. 3 (e.g., the difference between waveform 10 and another waveform 10 (not shown) at another of the nodes that has been shifted in time by one-third of a period T). Sinusoidal waveforms 16 and 18, on the other hand, are representative of those currents through the other windings. As denoted, the sinusoidal current waveforms are substantially identical with the exception of being shifted in phase. It is also preferred that all three windings have current flowing at any given time whereas the past typically had one of three windings without current flowing at any given time. It should be appreciated, however, that these graphs and waveforms presume the HI and LO switches are ideal. Namely, an ideal switch is one that has instantaneous switching time from open to closed and when the HI switch is closed, the LO switch is opened, and vice versa. Of course, the actual implementation of switches is such that there is some measurable time delay that must be accounted for when switching the HI and LO switches on and off.

Figure 4:
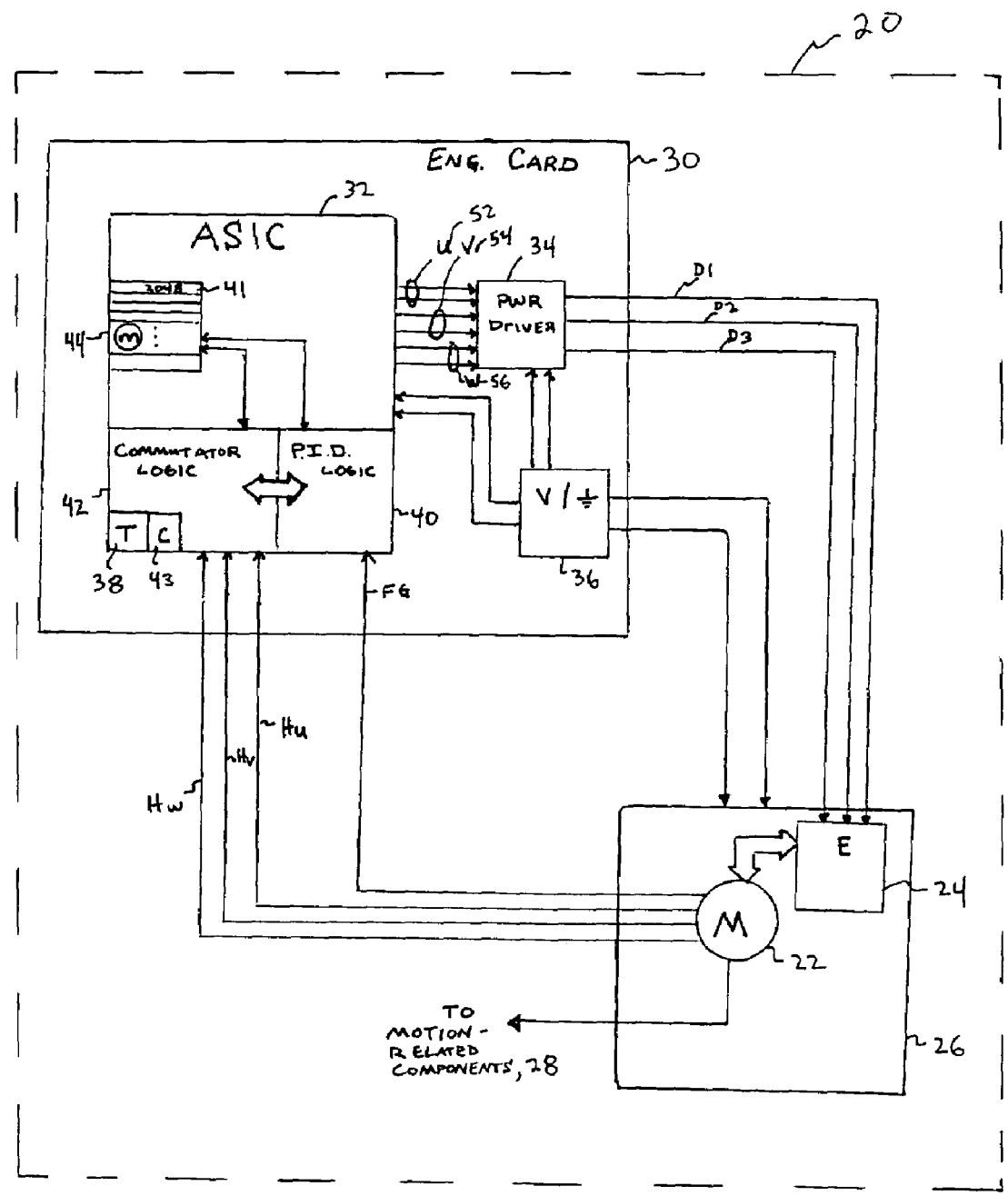
FIG. 4 is a diagrammatic view in accordance with the present invention of a control system in a laser printer for commutating a brushless dc motor.

With reference to FIG. 4, a laser printer of the invention is given generically as 20. It includes a brushless dc motor 22 and attendant electronics 24 per a typically off-the-shelf assembly 26 and the motor imparts motion to various movable components 28 in the printer, such as mirrors, belts, drums, paper transport structures, etc., for a variety of reasons. An engine card 30 includes a controller, in the form of an ASIC 32, a power driver 34 and a voltage and ground source 36 (on or off the engine card) for variously commonly powering and grounding the ASIC 32, the power driver 34, the assembly 26 and other components (not shown). Output from the motor and connected to the controller are the three typical hall-effect sensor signals $H_U$, $H_V$, and $H_W$ and an encoder FG signal. As is typical with brushless DC motors, the hall-effect sensors provide discrete signals indicative of six states of the motor, to indicate position. The order of occurrence of these states is dependent on motor construction and direction. In a common embodiment, the discrete signals are six sensor states 0-5 and correspond to logic high or low given per the sensor signal $H_U$, $H_V$, $H_W$ as 0,0,1; 0,1,0; 0,1,1; 1,0,0; 1,0,1; and 1,1,0, respectively. As skilled artisans know, however, these are not the actual order of occurrence but are representatively provided in this order according to binary counting. Unfortunately, the motor position per a standard assembly 26 is not affirmatively known at other than these six states and commutating the motor at only one of these six states has lead to the problems of the prior art.

Thus, the engine card and controller contemplate extrapolating the motor position between these six states and commutating the motor accordingly. Preferably, this includes the power driver supplying drive signals D1, D2, and D3 to the respective nodes 1, 2 and 3 of the motor (FIG. 1) to achieve the current waveforms in the windings as seen in FIG. 3. In a representative embodiment, the drive signals are voltage pulses between ground and +VOLTAGE that vary regularly in voltage and pulse width (PWM, in terms of duty cycle) and are variously on or off. In a preferred embodiment: the on or off switching rate occurs on the order of about 20 to about 35 kHz; the duty cycles vary between 0 to 100% as in FIG. 2; and the voltage varies between ground and +24 volts.

In a further representative embodiment, 256 discrete values of the motor position (positions 0-255, inclusive) are found in a lookup table T, 38, for a single commutation cycle of the motor and such relate to providing input to the power driver to achieve the desired drive signals. However, whenever an actual discrete signal is obtained from the motor, the discrete signal is used to reset the extrapolated position. In this manner, the proper phasing of motor commutation is maintained.

For example, a PID logic 40 receives the FG signal from the motor. In turn, it calculates a PWM in duty cycle for commutating the motor. This calculation is well known. However, in combination with the commutator logic 42, the calculated PWM is altered via a multiplier per a given position. Then, the controller creates six output signals 52, 54 and 56 (two per the U winding, both HI and LO; two per the V winding, both HI and LO, and two per the W winding, both HI and LO) serving as inputs to the power driver to create the drive signals D1, D2, and D3. In practice, these outputs (52, 54, and 56) are either a logic low or high. The HI outputs depend upon whether a counter C, 43, exceeds a certain register value 41 or not. If it exceeds the value, a logic low is output. If it does not, a logic high is output. Typically, the value of the register corresponds to a product of the commanded PWM from the controller and a value of the table T chosen by the position. Also, the counter counts down at a rate in increments proportionate to the PWM rate. In this regard, because it is preferred that the PWM exists between 20-35 kHz, the counting increment rates then occur in increments of their inverse, or about 7 to 12.5 nanoseconds (assuming a 12 bit counter). Naturally, a memory 44 is available to the controller during use, including each of the logics 40 and 42, and includes a variety of addresses, registers, or the like.

Figure 5:
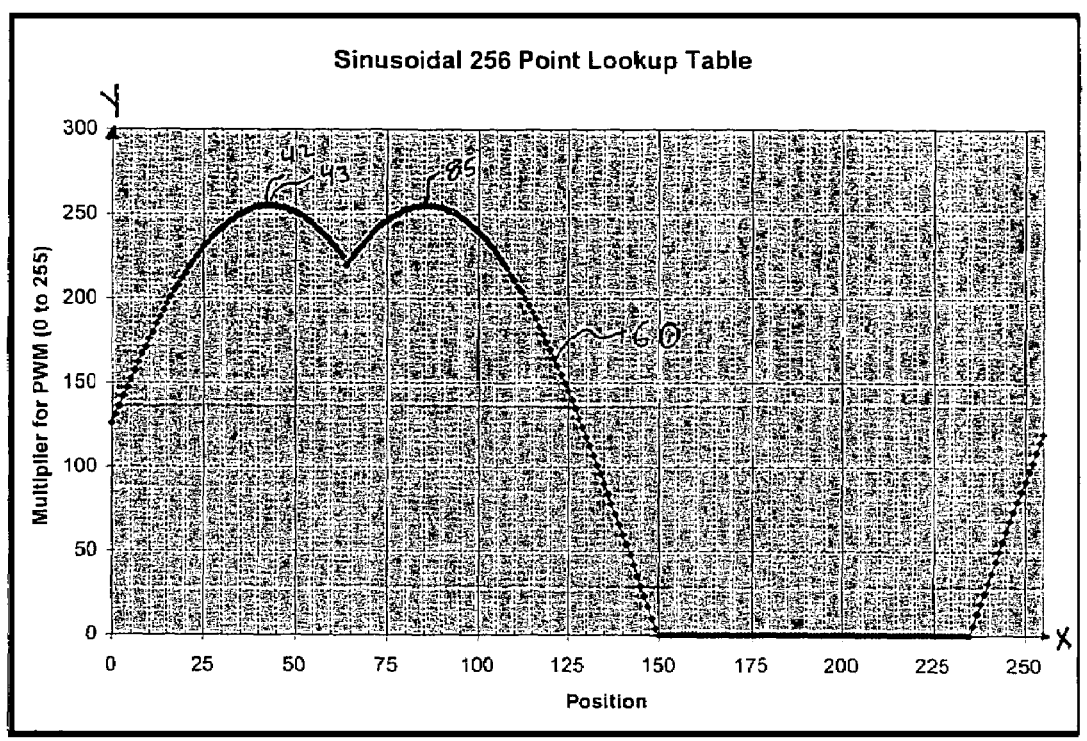
FIG. 5 is a graph in accordance with the present invention of a preferred lookup table in the control system of the laser printer.

With more specificity, FIG. 5 shows a waveform 60 for a HI switch of a winding U, V or W in terms of extrapolated motor position (x-axis) and a multiplier (y-axis) for the PWM from the PID controller. For instance, the position given as 0 corresponds to a value of 126. Thus, a multiplier for the PWM would be the value 126 divided by the highest possible state of the 256 states, or 126/255. To simplify implementation, the actual value used was 126/256. Similarly, at positions 42 and 43, and again at 85, the value of waveform 60 is 255. In this instance, the multiplier would be nearly 1 or 255/256. In another example, the multiplier would be 0 or 0/256 as between positions 150 and 235 (about one-third of the entire waveform 60). Of course, other positions are possible. In this regard, FIG. 6 shows a complete lookup table 38 of values for the waveform 60.

As expected during commutation of a motor, actual discrete signals from the hall-effect sensors will arrive at the controller of the invention. Because 256 possible values of states are used in extrapolating the motor, and because 6 states from the hall-effect sensors are expected during this time, the value of 256/6 yields 42.67. Thus, it is expected that for every 42.67 extrapolated positions of the motor, an actual discrete signal will arrive for the motor. In practice, this then occurs at extrapolated positions 0, 42.67, 85.33, 128, 170.67, and 213.33 as given by the boxes in the table.

Figure 7:
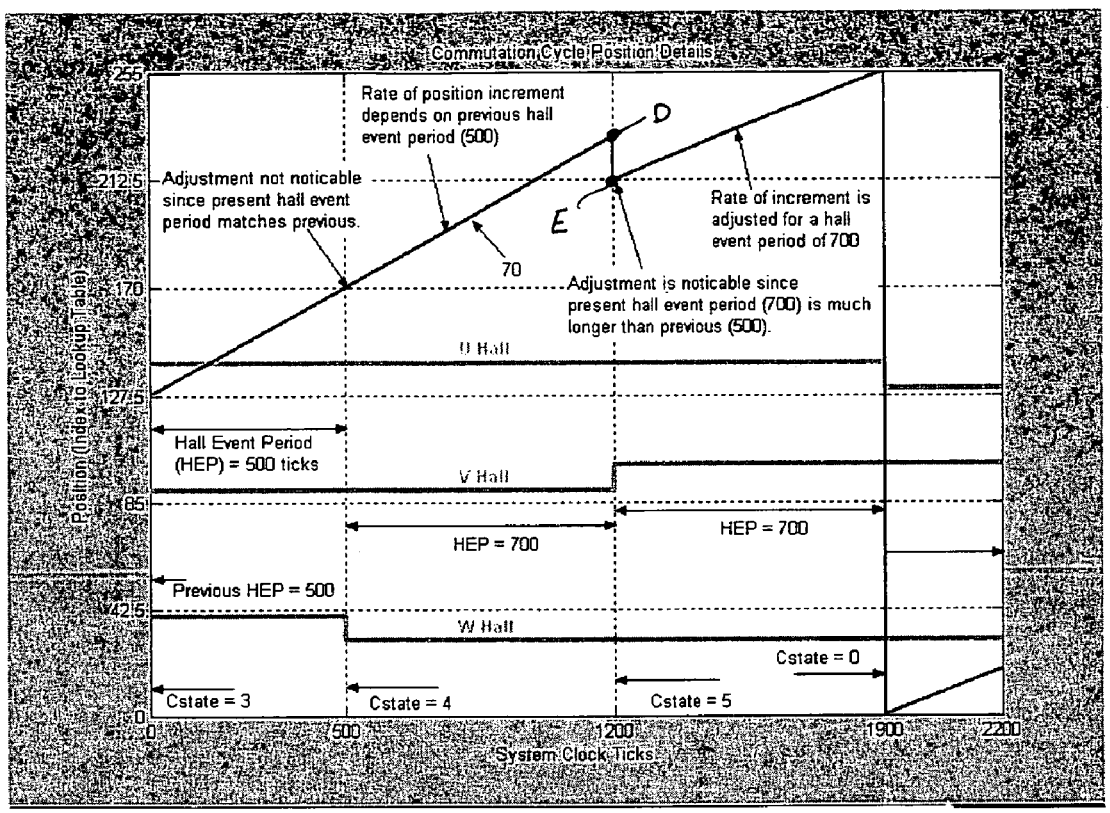
FIG. 7 is a graph in accordance with the present invention illustrating the timing of extrapolation of the position of a brushless dc motor in a laser printer.

Because each motor in a laser printer is imperfect relative to the other motors in similar printers, the actual arrival of a discrete signal from the hall-effect sensors will likely vary at other than exactly 42.67 extrapolated positions. That is why the controller of the engine card updates the extrapolated motor position whenever the discrete signals arrive, regardless of when they actually arrive. In this regard, FIG. 7 illustrates the operation of the commutation position calculation in the presence of infrequent and/or possibly inaccurate sensor position feedback. With reference to FIG. 7, the Position (or y-axis) relates to the extrapolated position or the x-axis of FIG. 6. The waveform, however, is given as 70. Along the x-axis of FIG. 7, two items of information are presented. That is, the commutator state $C_{state}$ (e.g., one of the six states of the hall-effect sensors) and clock ticks per a given engine card. In this regard, hall-effect states 4, 5 and 6 (or beginning again at state 0), for example, correspond to clock ticks of 500, 1200 and 1900, respectively. Using 3 hall sensors, and assuming that their placement about a motor is correct, the absolute position with regard to commutation using the 256 point table is known at each receipt of a hall state change (hall event). After each event and up until the next event, the position is incremented from the known position at a rate consistent with the time between the previous two events. Assuming that the motor speed does not change and that the hall sensors have been perfectly placed, the incremented position should align perfectly with the absolute position set at the next hall event. In the case that these assumptions do not hold, the incremented position value will be either greater or lesser than the absolute position that is set at the next hall event and a discontinuity in the position will be evident as is indicated in the jump from D to E. In other words, when the hall-effect sensor V Hall arrived at clock tick 1200, the extrapolated position was being given at position D, but the actual position should have been position E. Thus, an update to the actual position from the actual discrete signals of the motor needs to occur. Conversely, at clock tick 500, the extrapolated position and actual position needed no adjustment. Naturally, depending upon motor speed, the slope of the curve 70 will vary. Also, at clock tick 1900, the position starts over again at 0. Naturally, the clock tick is selected according to useful operating parameters of the laser printer and can vary as users deem appropriate.

The method indicated in FIG. 7 of position calculation and absolute position reset at each hall event is susceptible to inaccurate hall sensor placement which may cause discontinuities in the position value even at a perfectly constant speed. The position may alternately be set based on the FG signal encoder feedback and the periods of event occurrence of this more consistent signal used to determine the rate of position increment in between encoder events. This method may yield a more consistent position signal. The encoder is an incremental sensor and thus must still be used in conjunction with hall feedback which is absolute. To implement this, the absolute position is updated based on a particular hall state at a frequency of once per motor revolution.

Figure 8:
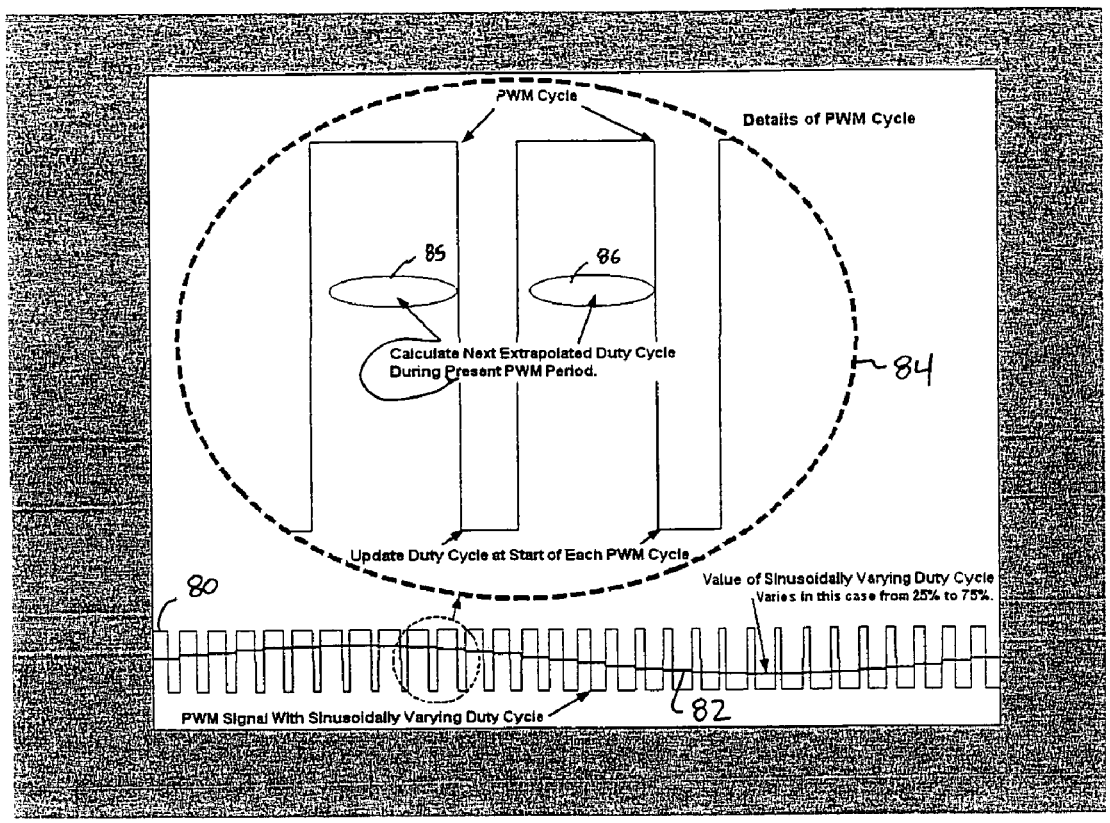
FIG. 8 is a graph and inset in accordance with the present invention of timing for calculating an updated duty cycle for a winding in a brushless dc motor in a laser printer.

In FIG. 8, a representative PWM signal 80 at a frequency of about 33 kHz with a duty cycle varying along the time axis from about 25% to about 75% according to a sinusoidal waveform 82 is illustrated. In the inset 84, the next PWM 86 (in duty cycle) is calculated by multiplying the value from the table T at the present position and the commanded PWM from the PID controller or other PWM generator. This calculation for the next PWM duty cycle takes place during the time of the present PWM period 85. This calculation takes some amount of time in clock ticks to perform and thus must begin at some finite time before the end of the present PWM cycle. Naturally, the longer one waits to make the next calculation, the closer the position signal used will be to the actual motor position during said PWM cycle. This then allows a new position based duty cycle to be used for each PWM period. Also, the counter C (FIG. 4) is used in this regard.

Figure 9:
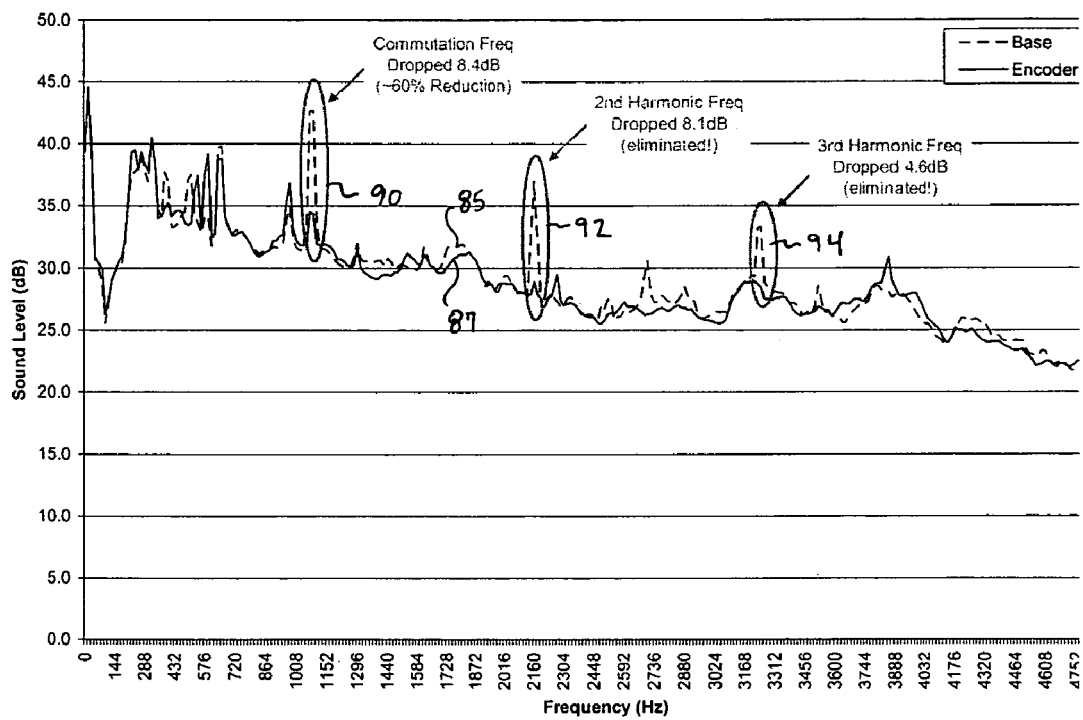
FIG. 9 is a graph in accordance with the present invention of a representative noise reduction from an actually commutated brushless dc motor for a laser printer.
Figure 10:
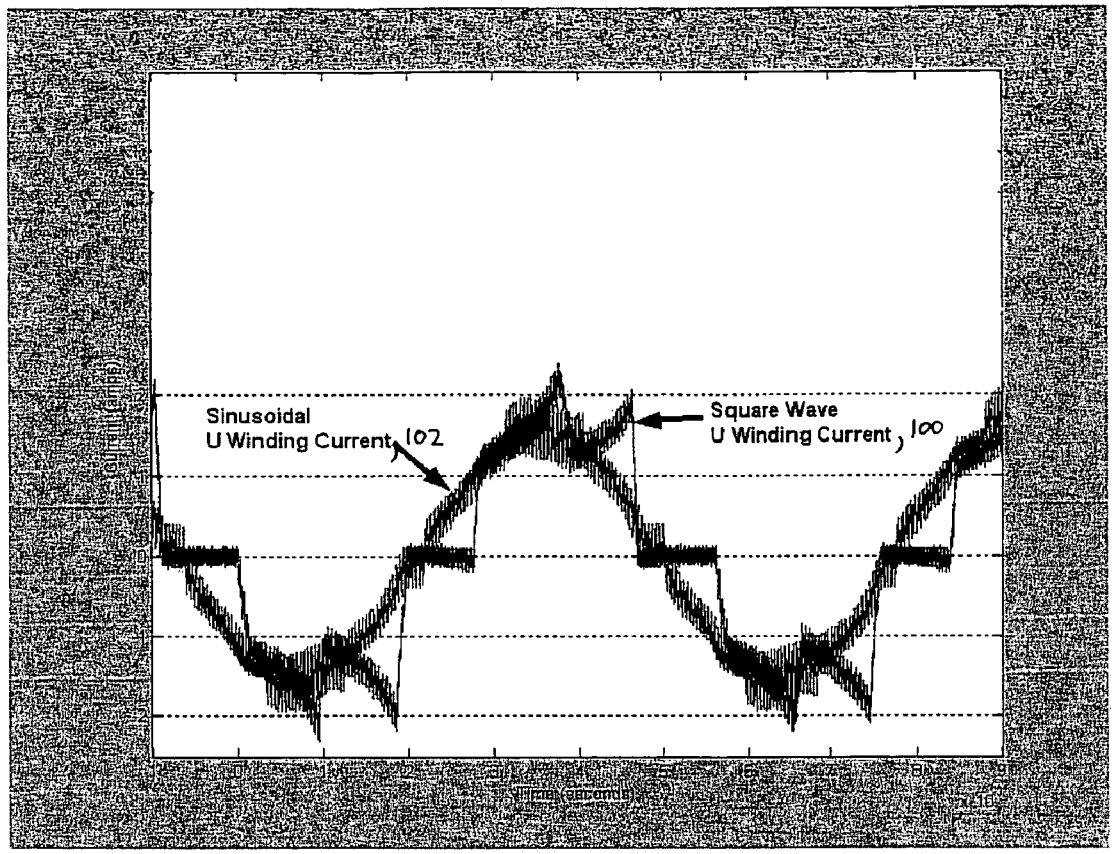
FIG. 10 is a graph in accordance with the present invention of the current in a winding of the brushless dc motor for rendering the noise reduction feature of FIG. 9.

In FIG. 9, two generally overlying waveforms 85, 87 are given. In the first, a brushless dc motor was commutated with a generally square waveform according to the prior art and noisy harmonics 90, 92 and 94 in the audible frequency range appeared per a given laser printer. In the second, the harmonics are fairly gone. Thus, a noise decibel reduction of about 8.4, 8.1 and 4.6 decibel (dB) was noticed and a quieter operating printer achieved. As a corollary, FIG. 10 shows overlaid actual current waveforms used per a given winding (U in this instance) of the commutated brushless dc motor to produce the noise graph of FIG. 9. As is seen, the prior art waveform is 100 and is generally a square wave. The instant invention, however, is given as 102 and generally follows a sinusoidal shape. Again, sinusoids have no harmonics.

In any orientation, certain advantages of the invention over the prior art are readily apparent. For example, standard off-the-shelf brushless dc motors with typical hall-effect sensors and FG signals can be used. This adds robustness and tends to lower manufacturing costs. Less intuitively, motor extrapolated positions can be used to provide stable commutation including updating the motor position whenever an actual position signal is received. Integrated assemblies in the form of an ASIC can replace the modularity of certain prior art designs. This improves manufacturability.

Finally, one of ordinary skill in the art will recognize that additional embodiments are also possible without departing from the teachings of the present invention. This detailed description, and particularly the specific details of the exemplary embodiments disclosed herein, is given primarily for clarity of understanding, and no unnecessary limitations are to be imported, for modifications will become obvious to those skilled in the art upon reading this disclosure and may be made without departing from the spirit or scope of the invention. Relatively apparent modifications, of course, include combining the various features of one or more figures with the features of one or more of other figures.

What is claimed is:

1. A laser printer, comprising:
   a brushless dc motor with three windings and a plurality of sensors providing discrete signals indicative of a position of the motor; and
   a controller connected to receive the discrete signals, wherein the controller extrapolates positions of the motor between the discrete signals and updates a motor position upon receiving the discrete signals, wherein the controller includes a PID and a commutator logic, the commutator logic including a lookup table of extrapolated motor positions.

2. The laser printer of claim 1, further including a high and low switch per each of the three windings.

3. The laser printer of claim 1, further including a driver connected to the controller to supply drive signals to each of the three windings.

4. The laser printer of claim 3, wherein the drive signals cause a current flowing in any of the three windings to follow a generally sinusoidal waveform.

5. The laser printer of claim 1, wherein the plurality of sensors providing the discrete signals includes at least one hall-effect sensor.

6. The laser printer of claim 1, wherein the plurality of sensors providing the discrete signals includes at least one encoder signal.

7. The laser printer of claim 1, wherein the controller is configured to calculate a pulse width modulation with variable duty cycle per one of the three windings.

8. The laser printer of claim 7, wherein the controller is configured to calculate a multiplier of the pulse width modulation.

9. The laser printer of claim 7, wherein the controller is configured to obtain a second and third pulse width modulation per the other two windings of the three windings by time adjusting the pulse width modulation per the one of the three windings.

10. A laser printer, comprising:
   a brushless dc motor with three windings and a plurality of sensors providing discrete signals indicative of a position of the motor;
   a high and low switch per each winding of the three windings;
   a driver connected to supply drive signals to each of the high and low switches per the each winding; and
   a controller connected to the driver and to the motor to receive the discrete signals, wherein the controller extrapolates positions of the motor between the discrete signals and applies an extrapolated position pulse width modulation duty cycle and multiplier to the each winding via the driver so that a current flowing in any of the three windings follows a generally sinusoidal waveform, wherein the controller further includes a counter and a register value, the controller supplying a logic high or low to the driver depending whether the counter is at a count below or above the register value.

11. The laser printer of claim 10, wherein the controller is further configured to update a motor position upon receiving the discrete signals.

12. The laser printer of claim 10, wherein the extrapolated position pulse width modulation duty cycle and multiplier includes an off time for about one-third of a period.

13. A method of commutating a brushless dc motor in a laser printer, the motor having three windings, comprising:
   by a controller, receiving discrete position signals from the motor;
   by the controller, extrapolating a motor position during times of not said receiving the discrete position signals from the motor, wherein the extrapolating includes communicating with a lookup table of commutator logic, the controller including a PID and the commutator logic;
   applying drive signals to each winding of the motor during the times of the not said receiving; and
   thereafter, updating a motor position upon receiving another discrete position signal.

14. The method of claim 13, wherein the applying further includes causing a current flowing in any of the three windings to follow a generally sinusoidal waveform.

15. The method of claim 13, further including calculating an extrapolated position pulse width modulation and multiplier per each of the three windings.

16. The method of claim 15, wherein the extrapolating further includes calculating about 256 motor positions.

17. The method of claim 13, wherein the receiving the discrete position signals from the motor further includes receiving at least one encoder signal and at least three hall-effect sensor signals.

* * * * *